(12) United States Patent
Seeley

(10) Patent No.: US 10,464,002 B2
(45) Date of Patent: Nov. 5, 2019

(54) CENTRIFUGAL ABATEMENT SEPARATOR

(71) Applicant: Edwards Limited, Burgess Hill, West Sussex (GB)

(72) Inventor: Andrew James Seeley, Bristol (GB)

(73) Assignee: Edwards Limited, Burgess Hill, West Sussex (GB)

(*) Notice: Subject to any disclaimer, the term of this patent is extended or adjusted under 35 U.S.C. 154(b) by 81 days.

(21) Appl. No.: 15/327,419

(22) PCT Filed: Jul. 20, 2015

(86) PCT No.: PCT/GB2015/052092
§ 371 (c)(1),
(2) Date: Jan. 19, 2017

(87) PCT Pub. No.: WO2016/012771
PCT Pub. Date: Jan. 28, 2016

(65) Prior Publication Data
US 2017/0197164 A1    Jul. 13, 2017

(30) Foreign Application Priority Data
Jul. 21, 2014    (GB) .................................. 1412878.9

(51) Int. Cl.
*B01D 45/14*    (2006.01)
*B01D 47/16*    (2006.01)
(Continued)

(52) U.S. Cl.
CPC ............. *B01D 45/14* (2013.01); *B01D 47/16* (2013.01); *B01D 50/004* (2013.01)

(58) Field of Classification Search
CPC ...... B01D 45/14; B01D 47/16; B01D 50/004; B04B 5/12
See application file for complete search history.

(56) References Cited

U.S. PATENT DOCUMENTS 5,149,345 A * 9/1992 Bouchard .............. B01D 45/14
  55/406
5,185,016 A * 2/1993 Carr ....................... B01D 47/18
  261/92
(Continued)

FOREIGN PATENT DOCUMENTS

CN    1278745 A    1/2001
CN    101437596 A    5/2009
(Continued)

OTHER PUBLICATIONS

British Combined Search Report and Examination Report under Sections 17 and 18(3) dated Dec. 24, 2014 in GB Application GB 1412878.9, 6 pgs.
(Continued)

*Primary Examiner* — Jason M Greene
(74) *Attorney, Agent, or Firm* — Westman, Champlin & Koehler, P.A.; Theodore M. Magee

(57) ABSTRACT

A separator apparatus and method are disclosed. The separator apparatus comprises: an inlet operable to receive an effluent stream comprising a fluid and particles; a centrifugal separator comprising a radial fan and a centrifugal particle separator operable to separate at least some of the particles from the fluid; a fluid outlet for providing the fluid; and a particle outlet for providing the particles separated from the fluid. In this way, particles may be removed effectively from the fluid in the effluent stream without the need for an inconvenient electrostatic precipitator or other large particle separator. Instead, the apparatus provides for improved particle capture and removal within a smaller footprint. This provides for a more efficient and compact device.

16 Claims, 5 Drawing Sheets

(51) Int. Cl.
*B01D 50/00* (2006.01)
*B04B 5/12* (2006.01)

(56) References Cited

U.S. PATENT DOCUMENTS

| | | | | |
|---|---|---|---|---|
| 6,004,365 A | * | 12/1999 | Fiacco | B01D 45/14 55/400 |
| 6,616,840 B1 | * | 9/2003 | Boele | B01D 45/14 210/297 |
| 2003/0159580 A1 | * | 8/2003 | Roth | B01D 45/14 95/226 |
| 2004/0069047 A1 | * | 4/2004 | Coyle | B01D 50/004 73/28.04 |
| 2007/0051245 A1 | | 3/2007 | Yun | |
| 2012/0067788 A1 | * | 3/2012 | Boele | B01D 45/14 209/132 |
| 2017/0144092 A1 | | 5/2017 | Seeley | |

FOREIGN PATENT DOCUMENTS

| | | | | |
|---|---|---|---|---|
| DE | 247047 | * | 1/1910 | |
| DE | 247047 C | | 1/1910 | |
| DE | 102006039275 A | | 2/2008 | |
| DE | 102006039275 A1 | * | 2/2008 | B01D 47/02 |
| EP | 0422555 A1 | | 4/1991 | |
| EP | 0694735 A1 | | 1/1996 | |
| GB | 153109 A | | 11/1920 | |
| JP | S5079970 | | 7/1975 | |
| JP | S6167917 | | 10/1986 | |
| JP | H0268414 A | | 3/1990 | |
| JP | H09287722 A | | 11/1997 | |
| JP | H1162553 A | | 3/1999 | |
| JP | 2005500501 A | | 1/2005 | |
| JP | 2007520339 A | | 7/2007 | |
| JP | 2008161861 A | | 7/2008 | |
| JP | 2009008333 A | | 1/2009 | |
| KR | 20110126354 A | | 11/2011 | |
| KR | 1020110126354 | * | 11/2011 | B04B 1/06 |
| KR | 101266402 | * | 5/2013 | B01D 45/14 |
| KR | 101266402 B | | 5/2013 | |
| WO | 9858729 | | 12/1998 | |
| WO | WO 98/58729 | * | 12/1998 | B01F 3/04 |
| WO | 2005075799 A | | 8/2005 | |
| WO | 2006053231 A2 | | 5/2006 | |

OTHER PUBLICATIONS

International Search Report and Written Opinion dated Oct. 19, 2015 in corresponding International Application No. PCT/GB2015/052092, 9 pgs.
First Office Action dated Jul. 2, 2018 and Chinese Search Report dated Jul. 20, 2018 for corresponding Chinese Application No. CN201580039504.7.
Prosecution history of corresponding U.S. Appl. No. 15/327,407 including: Non-Final Rejection dated Jun. 21, 2019.
British Examination Report dated Jan. 21, 2015 and Search Report dated Jan. 20, 2015 for corresponding British application Serial No. GB1412877.1.
Notification of Reason for Rejection dated May 30, 2019 for corresponding Japanese application Serial No. JP2017-503884.
Notification of Reason for Rejection dated Jun. 13, 2019 for corresponding Japanese application Serial No. JP2017-503895.
Notification of Transmittal of International Search Report and Written Opinion dated Oct. 13, 2015 for corresponding PCT application Serial No. PCT/GB2015/052091.

* cited by examiner

CENTRIFUGAL ABATEMENT SEPARATOR

This application is a national stage entry under 35 U.S.C. § 371 of International Application No. PCT/GB2015/052092, filed Jul. 20, 2015, the entire content of which is incorporated herein by reference.

TECHNICAL FIELD OF THE INVENTION

The present invention relates to a separator apparatus and method. Embodiments relate to a separator apparatus and method for separating fluid and particles in an effluent stream.

BACKGROUND OF THE INVENTION

Separator apparatus are known. Such apparatus are used for treatment of an effluent stream containing particles in a fluid.

Although such apparatus provide for treatment of the effluent stream, they have a number of shortcomings. Accordingly, it is desired to provide an improved separator apparatus.

SUMMARY OF THE INVENTION

According to a first aspect, there is provided a separator apparatus, comprising: an inlet operable to receive an effluent stream comprising a fluid and particles; a centrifugal separator comprising a radial fan and a centrifugal particle separator operable to separate at least some of the particles from the fluid; a fluid outlet for providing the fluid; and a particle outlet for providing the particles separated from the fluid.

The first aspect recognizes that the efficiency of separator apparatus may be poor when separating particles and fluid in an effluent stream. Also, although a particle separator such as an electrostatic precipitator may be used to capture and remove particles, these are inconvenient since to be effective they need to be large and operate at high voltage (typically 25 kV). Accordingly, a separator apparatus is provided. The apparatus may comprise an inlet which receives an effluent stream. The effluent stream may comprise both a fluid (such as a gas) and particles. The apparatus may also comprise a centrifugal separator. The centrifugal separator may comprise both a radial fan and a centrifugal particle separator. The radial fan and centrifugal particle separator may both separate at least some of the particles from the fluid to provide a treated fluid. The apparatus may also comprise a fluid outlet which provides the treated fluid (absent the separated particles). The apparatus may also comprise a particle outlet which provides the particles separated from the fluid. In this way, particles may be removed effectively from the fluid in the effluent stream without the need for an inconvenient electrostatic precipitator or other large particle separator. Instead, the apparatus provides for improved particle capture and removal within a smaller footprint. This provides for a more efficient and compact device.

In one embodiment, the effluent stream comprises water. Accordingly, the effluent stream may also contain water. In one embodiment, the apparatus comprises a water inlet operable to introduce water into the effluent stream. Alternatively, or additionally, water may be added into the effluent stream. In either event, the presence of water may facilitate the separation and capture of particles within the fluid by the centrifugal separator.

In one embodiment, the centrifugal separator comprises a cylindrical chamber defined by a base plate and an opposing plate coupled by a rim. It will be appreciated that the distance between the opposing plates may be significantly less than the diameter of those opposing plates, which provides for a particularly compact arrangement.

In one embodiment, the inlet is centrally-located in the opposing plate. Providing the inlet centrally within the plate helps to maximise the centrifugal separation and avoids complicated feeds.

In one embodiment, the particle outlet is located in the base plate and is operable to drain the particles and the water into a sump. Accordingly, the particles and water may be removed under gravity.

In one embodiment, the fluid outlet is located in the opposing plate and is operable to vent the fluid. Accordingly, the treated fluid may vent or exhaust from the centrifugal separator under pressure.

In one embodiment, the particle outlet and the fluid outlet are located radially away from the inlet.

In one embodiment, the radial fan is rotatable and comprises a plurality of vanes extending from the inlet towards the rim.

In one embodiment, the vanes taper towards the rim. Providing tapering towards the rim reduces the turbulent flow in the vicinity of the rim.

In one embodiment, the vanes terminate prior to the rim to define a volute within which the effluent stream accelerated by the vanes is received. Hence, the effluent stream may be received within a volute defined between the ends of the vanes and the rim.

In one embodiment, walls of the volute are configured to entrain the particles and the water to separate the particles and the water from the fluid. Accordingly, the particles and water may be received and retained by the walls in order to separate them from the treated fluid.

In one embodiment, the particle outlet is provided proximate at least one of the rim and an end of the vane. Hence, the particle outlet is provided in the vicinity of the location where the particles gather.

In one embodiment, the fluid outlet is provided proximate at least one of the rim and an end of the vane.

In one embodiment, the centrifugal particle separator is rotatable and comprises a plurality of conduits extending axially proximate the rim to receive the effluent stream. Accordingly, the centrifugal particle separator may be formed by conduits which extend along the axis of rotation of the centrifugal particle separator near its rim and which receive the effluent stream. Hence, the conduits may be aligned with the axis of rotation of the centrifugal particle separator.

In one embodiment, a wall of the conduit is configured to entrain the particles and the water to separate the particles and the water from the fluid during rotation of the conduit as the effluent stream is conveyed therethrough. Accordingly, the walls of the conduits receive and retain the particles and water as the effluent stream passes through those conduits.

In one embodiment, each conduit comprises a conduit inlet for receiving the effluent stream and a conduit outlet as the outlet for venting the fluid, the combustion particles and the water entrained by the wall draining back through the inlet. Accordingly, the separated particles and water drain back out of each conduit through its inlet.

In one embodiment, the conduits are formed within an annular body extending along the rim. Hence, the conduits are formed within a ring which extends from the rim.

In one embodiment, fluid separated from the particles and the water entrained by the walls of the volute of the radial fan is conveyed to conduits of the centrifugal particle separator. Accordingly, the radial fan may perform the initial separation and the centrifugal particle separator may perform subsequent separation.

In one embodiment, the vanes and conduits are dimensioned to match a fluid velocity within the volute with a fluid velocity within the conduits. This helps to reduce turbulence.

In one embodiment, the apparatus comprises a drive operable to rotate the centrifugal separator.

In one embodiment, a tolerance between the inlet and the centrifugal separator is dimensioned to be packed by water to provide a rotational seal. Hence, the water may also be utilised to provide a rotational seal.

In one embodiment, the opposing plate comprises drain holes operable to drain water received on a surface thereof. Hence, water draining from the outlet or void coupled with the outlet then flows back into the centrifugal separator for its removal and any entrained particles.

In one embodiment, the apparatus is operable to convey the effluent stream under pressure from the inlet to the outlet.

In one embodiment, the apparatus comprises a pump operable to pump water received from the particle outlet to at least one of the water inlet and a bearing supporting the centrifugal separator. Accordingly, the same drive and water can be used for multiple purposes.

According to a second aspect, there is provided a method of treating an effluent steam, comprising: receiving an effluent stream comprising a fluid and particles at an inlet; centrifugally separating at least some of the particles from the fluid with a radial fan and a centrifugal particle separator; providing the fluid at a fluid outlet; and providing the particles separated from the treated fluid at a particle outlet.

In one embodiment, the effluent stream comprises water.

In one embodiment, the method comprises introducing water into the effluent stream.

In one embodiment, the centrifugal separator comprises a cylindrical chamber defined by a base plate and an opposing plate coupled by a rim.

In one embodiment, the inlet is centrally-located in the opposing plate.

In one embodiment, the method comprises draining the particles and the water through the particle outlet located in the base plate into a sump.

In one embodiment, the method comprises venting the fluid through the fluid outlet located in the opposing plate.

In one embodiment, the particle outlet and the treated fluid outlet are located radially away from the inlet.

In one embodiment, the method comprises rotating the radial fan which comprises a plurality of vanes extending from the inlet towards the rim.

In one embodiment, the vanes taper towards the rim.

In one embodiment, the vanes terminate prior to the rim to define a volute within which the effluent stream accelerated by the vanes is received.

In one embodiment, the method comprises entraining the particles and the water on walls of the volute to separate the particles and the water from the fluid.

In one embodiment, the particle outlet is provided proximate at least one of the rim and an end of the vane.

In one embodiment, the treated fluid outlet is provided proximate at least one of the rim and an end of the vane.

In one embodiment, the method comprises rotating the centrifugal particle separator which comprises a plurality of conduits extending axially proximate the rim to receive the effluent stream.

In one embodiment, the method comprises entraining the particles and the water on a wall of the conduit to separate the particles and the water from the fluid during rotation of the conduit as the effluent stream is conveyed therethrough.

In one embodiment, the method comprises receiving the effluent stream at a conduit inlet of each conduit and venting the fluid at a conduit outlet of each conduit and draining the combustion particles and the water entrained by the wall back through the inlet.

In one embodiment, the conduits are formed within an annular body extending along the rim.

In one embodiment, the method comprises conveying the fluid separated from the particles and the water entrained by the walls of the volute of the radial fan to conduits of the centrifugal particle separator.

In one embodiment, the vanes and conduits are dimensioned to match a fluid velocity within the volute with a fluid velocity within the conduits.

In one embodiment, the method comprises rotating the centrifugal separator with a drive.

In one embodiment, the method comprises dimensioning a tolerance between the inlet and the centrifugal separator to be packed by water to provide a rotational seal.

In one embodiment, the method comprises draining water received on a surface of the opposing plate through drain holes provided therein.

In one embodiment, the method comprises conveying the effluent stream under pressure from the inlet to the outlet.

In one embodiment, the method comprises pumping water received from the particle outlet to at least one of the water inlet and a bearing supporting the centrifugal separator.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

In order that the present invention may be well understood, two embodiments thereof, which are given by way of example only, will now be described in more detail, with reference to the accompanying drawings, in which.

DESCRIPTION OF THE EMBODIMENTS

Before discussing the embodiments, first an overview will be provided.

Embodiments provide a separator having a centrifugal separator for treating an effluent stream. The centrifugal separator utilises both a radial fan and a centrifugal particle separator which assist in the extraction of particulate or other material present in the effluent stream.

The separator operates centrifugally through the combination of a radial fan and a centrifugal particle separator. The presence of both the radial fan and centrifugal particle separator provides for efficient and effective particle separation within a compact arrangement. In particular, the radial fan performs an initial separation to remove at least some particles from the effluent stream (such as a gas). The effluent stream with at least some particles removed is provided to the centrifugal particle separator where at least some further particles are removed. Typically, water or other liquid may be present within the effluent stream (or may be introduced into the effluent stream) to facilitate the entraining of the particles within the centrifugal separator. The centrifugal separator removes both the particles and water and exhausts the fluid without the removed particles and water as a treated fluid. Accordingly, the treated fluid would have the vast majority of the particles and any water removed. This may then be vented or provided for subsequent further processing.

Separator Apparatus

Figure 1A:
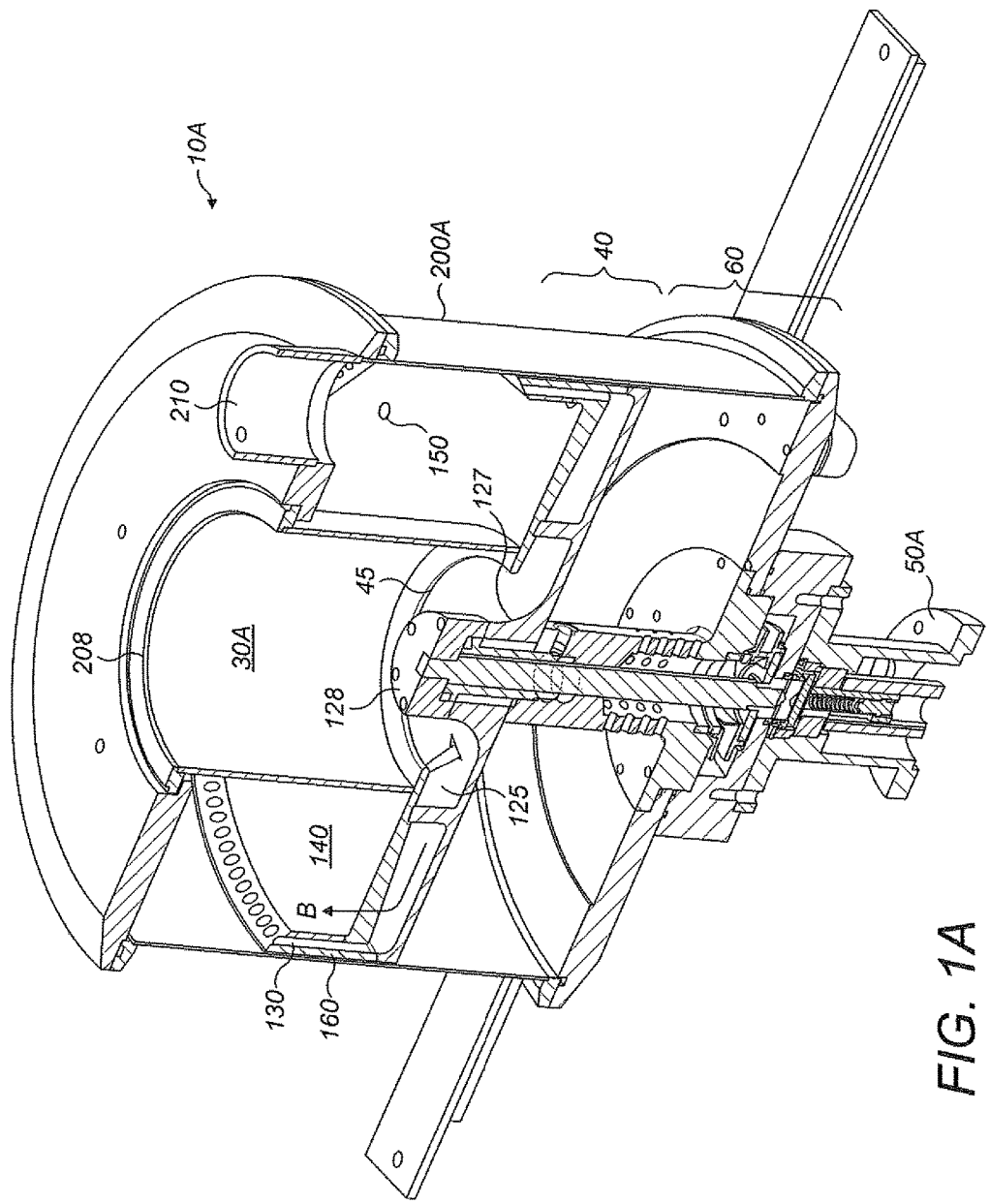
FIG. 1A illustrates a separator apparatus according to one embodiment.

FIG. 1A illustrates a separator apparatus, generally 10A, according to one embodiment. The separator apparatus 10A treats an effluent gas stream. The effluent stream is received at an inlet 208 feeding a chamber 30A. The effluent stream comprises a fluid stream, together with particulate material and a liquid, in this example water, although it will be appreciated from that other liquids may be utilised.

Centrifugal Separator

Figure 2A:
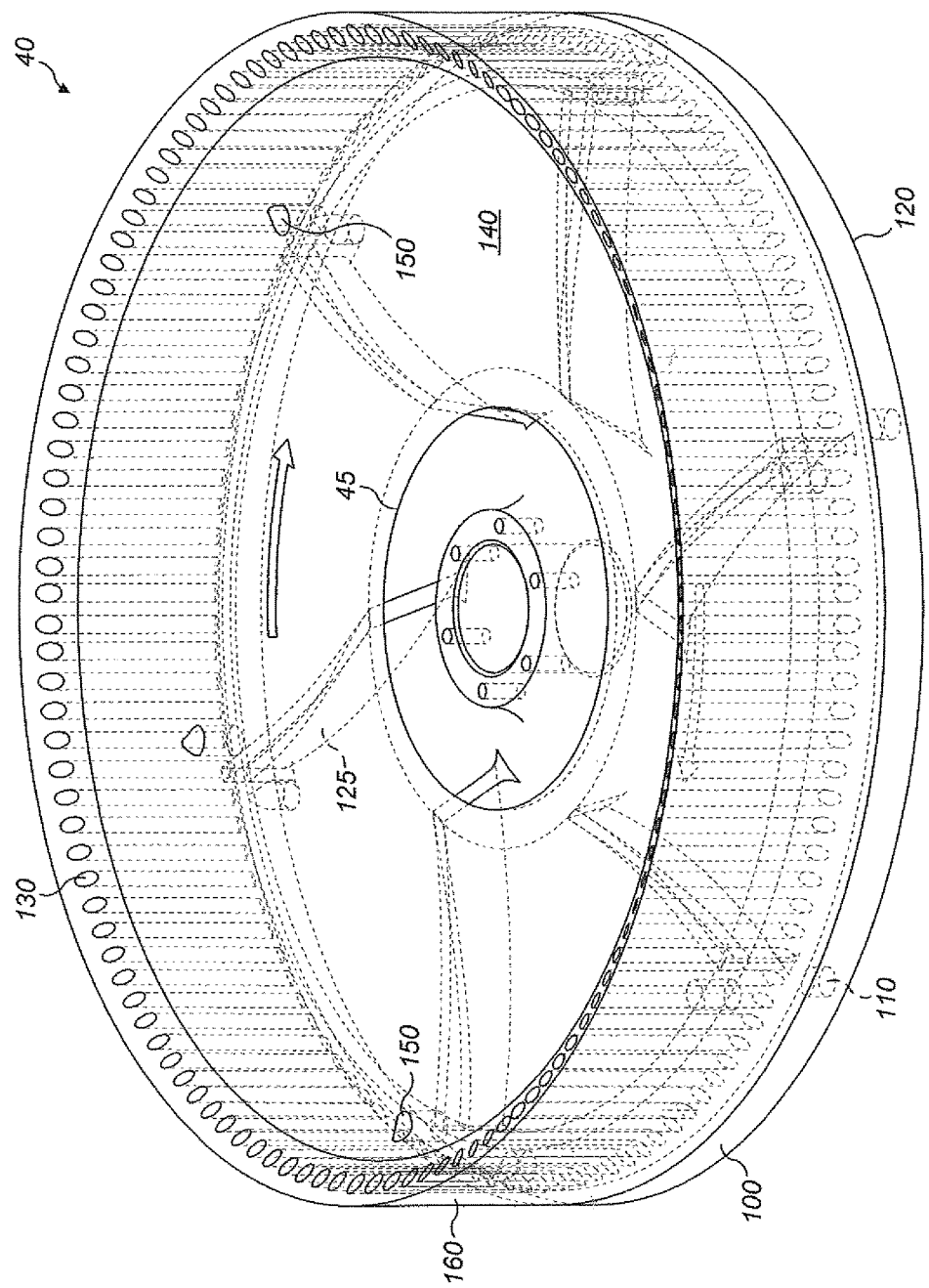
FIG. 2A illustrates a centrifugal separator of the separator apparatus of FIGS. 1A and 1B in detail.
Figure 2B:
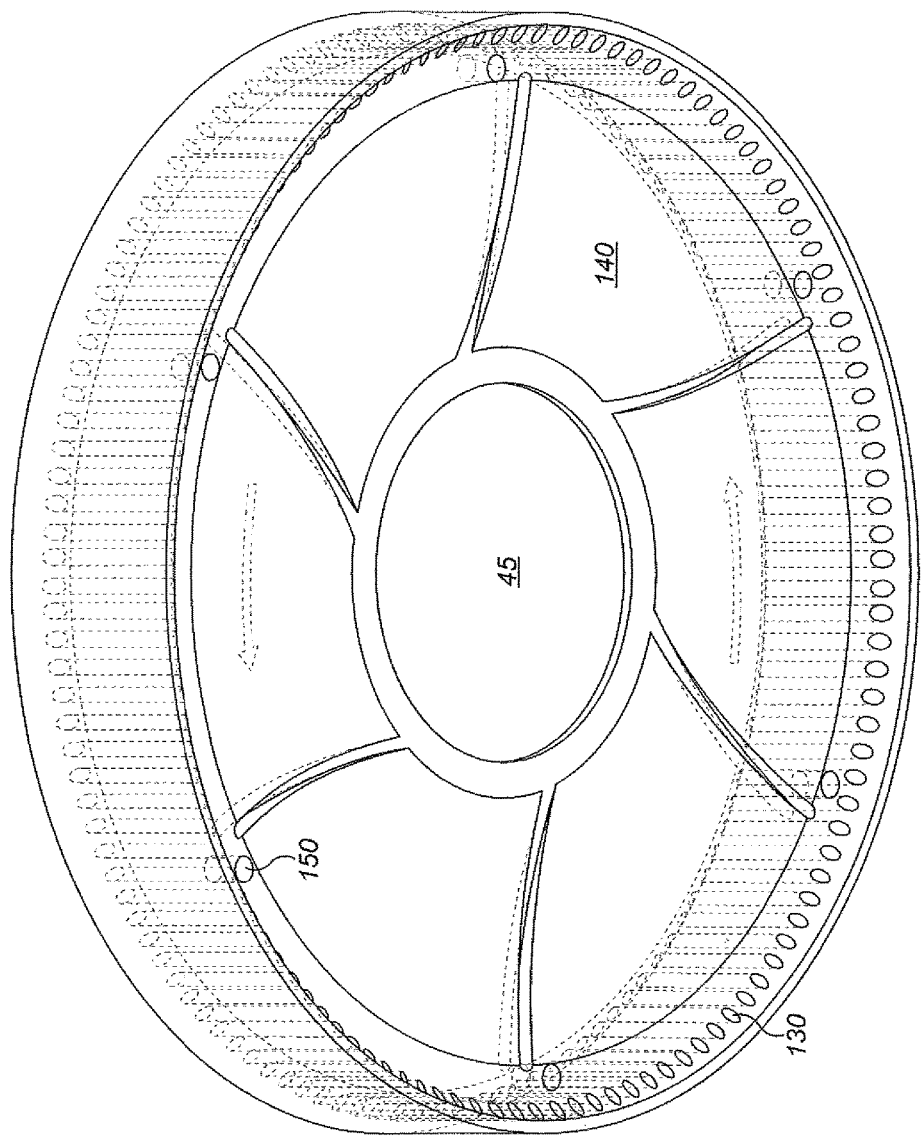
FIG. 2B illustrates a centrifugal separator of the separator apparatus of FIGS. 1A and 1B in more detail.
Figure 2C:
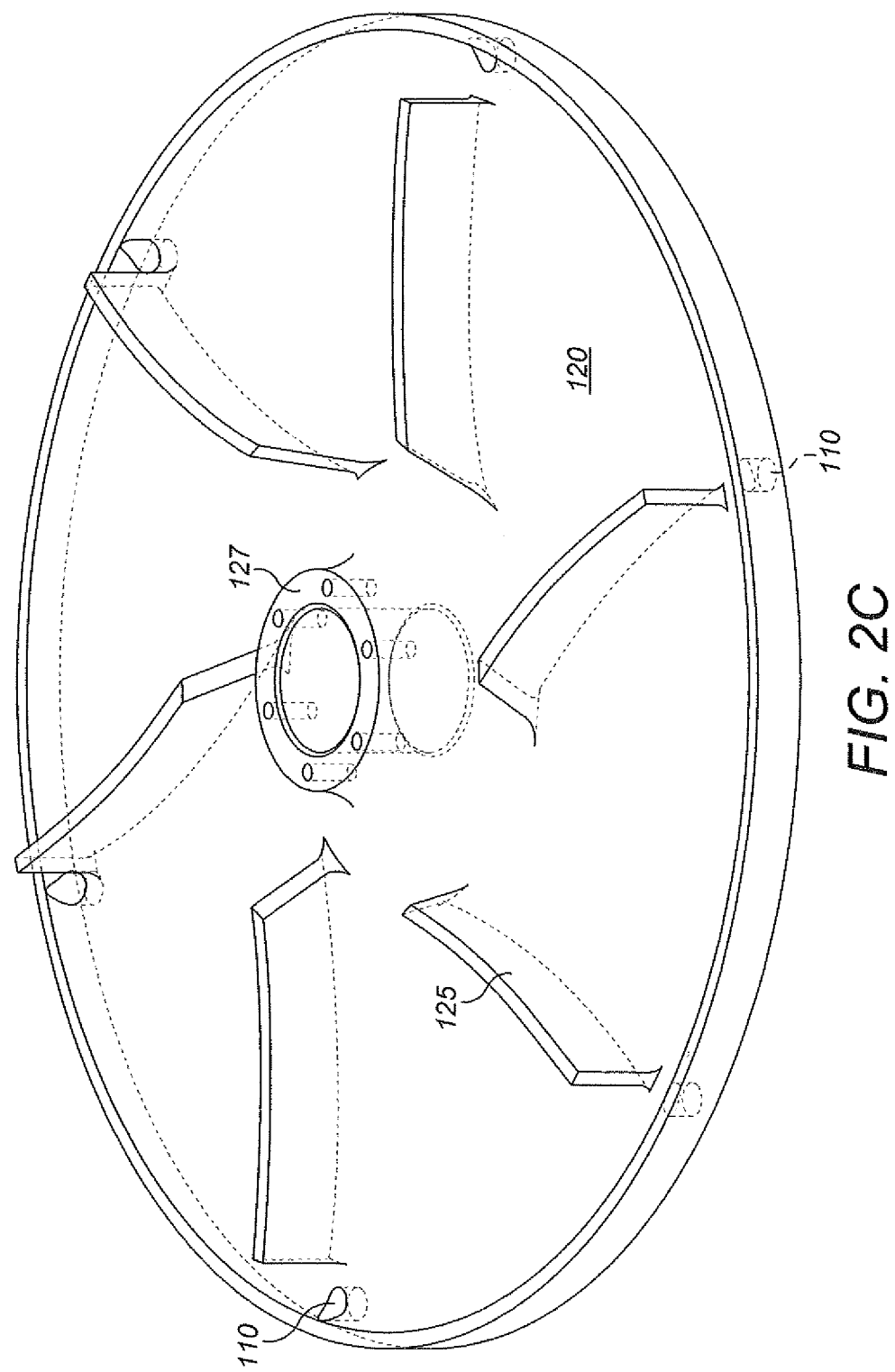
FIG. 2C illustrates a centrifugal separator of the separator apparatus of FIGS. 1A and 1B in further detail.

The effluent stream is received by a centrifugal separator 40, which is illustrated in more detail in FIGS. 2A to 2C. In particular, an inlet 45 is provided through which the effluent stream is received by the centrifugal separator 40, including any water and any already entrained combustion particles within the fluid stream and the water.

The centrifugal separator 40 is operable to rotate with respect to the other parts of the separating apparatus 10A within a common housing 200A. The dimension of the centrifugal separator 40 is selected to provide a reasonable fit in the common housing 200A to discourage fluid bypassing the centrifugal separator 40 via drain holes. The clearance between the end of the chamber 30A and the top of an opposing plate 140 is dimensioned to be small enough to minimize recirculation which otherwise spoils the suction generated by the centrifugal separator 40. Water typically packs this clearance, further reducing leakage.

The centrifugal separator 40 is rotated by a drive (not shown) coupled to a motor coupling 50A and has a pair of opposing plates 120, 140 between which is a radial fan component which feeds a centrifugal particle separator upstanding from the opposing plate 140. In overview, the stream received at the inlet 45 undergoes a two-phase separation process to remove particles and water from the fluid stream to leave the fluid stream. The water present in the effluent stream assists in removal of the particles. Accordingly, the fluid stream exiting the centrifugal separator 40 will have most of the water and particles removed.

In particular, as a first phase, the effluent stream is accelerated by vanes 125 of the radial fan component from the inlet 45 towards a rim 100. This initial action performs an initial separation since many of the particles and much of the water is then entrained by an inner surface of the rim 100 and drains into a sump 60 via drain holes 110 provided in a base plate 120 of the centrifugal separator 40. It will be appreciated that if the effluent stream does not already have water present, then this may be added by the separating apparatus 10A either within the chamber 30A or the centrifugal separator 40 to aid the particle capture in the centrifugal separator 40.

The centrifugal separator 40 comprises the base plate 120 and the opposing plate 140 which is spaced away from the base plate 120 to create a chamber, void or space between the plates 120, 140 within which the effluent stream flows. The opposing plate 140 is provided with the inlet 45 at its centre which receives the effluent stream from the chamber 30A. The base plate 120 and the opposing plate 140 are fused together at the periphery or rim 100. Between the plates 120, 140 are vanes 125 which urge the effluent stream from the centre to the periphery, thereby creating a reduction in pressure at the inlet 45. In this example, the vanes are arranged tangentially with respect to the inlet 45 and are curved and taper towards the rim 100. However, it will be appreciated that other arrangements of vanes 125 may also be utilized. As best illustrated in FIG. 2C, the vanes 125 extend only partially towards the rim 100, leaving a clear passage or volute within which the combustion particles and water may gather.

The positive pressure of the effluent stream from the chamber 30A together with the acceleration of the effluent stream by the radial fan component causes a flow of the effluent stream once it is received within the volute adjacent the inner surface of the rim 100 to flow in the direction B into a centrifugal particle separator. Adding the radial fan element provides for a sub-atmospheric inlet and avoids the requirement for a volute housing to feed the centrifugal separator 40.

The centrifugal particle separator is formed by an elongate annular body or rim 160 extending from the opposing plate 140 within which is provided a plurality of the conduits 130. The conduits 130 together form a centrifugal particle separator which further removes particles and water from the effluent stream. As can be seen, these conduits 130 have a long and narrow aspect ratio. As the particles, water and fluid travel through a conduit 130 that conduit acts as a centrifuge, centrifugal acceleration of the entrained particles in the stream causes them to be thrown to the walls of the conduits 130. Entrained water droplets are also thrown to the walls of the conduits 130 and help to wash the combustion particles down. The entrained material then flows back down the conduit 130 under gravity and back towards the volute adjacent the inner surface of the rim 100 where it can then drain through the drain holes 110 and into the sump 60. The fluid, substantially free of particles and water droplets exit at the top of the plurality of conduits 130 and are vented through an outlet 210.

Figure 1B:
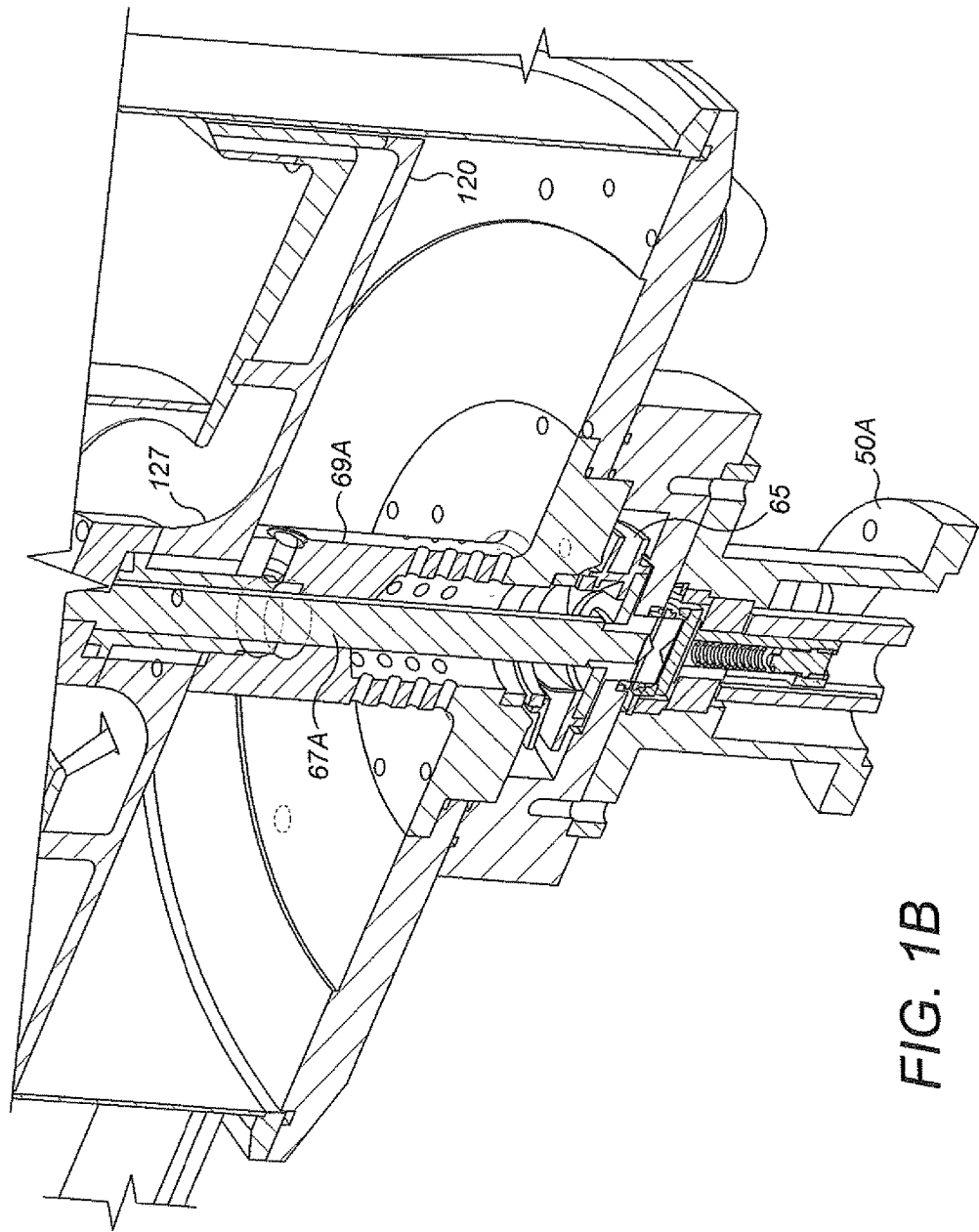
FIG. 1B illustrates a separator apparatus according to another embodiment.

As illustrated in more detail in FIG. 1B, the base plate 120 also comprises a central hub 127 by which the centrifugal separator 40 is rotatably mounted on a column 69A housing a driveshaft 67A The driveshaft 67A is driven by a motor (not shown) via a motor coupling 50A. The column 69A houses the driveshaft 67A which acts to drive the centrifugal separator via a rotor coupling 128 attached to the hub 127. In this arrangement, the motor coupling 50A is for a direct drive.

Any residual particles which entrained by any water prior to the fluid being vented through the outlet 210 are received by the upper plate 140 of the centrifugal separator 40. Drain holes 150 are provided to drain back into the chamber within which the radial fan component is located. Water also drains into the conduits 130 in order to help remove any materials entrained on the walls of the conduits 130.

Sump

The sump 60 receives water and particles and utilizes a centrifugal water pump 65 which is also powered by the motor coupling 50A to provide water to the separating apparatus 10A, as well as to lubricate the bearings for the centrifugal separator 40.

In particular, the column 69 also forms the inlet of the centrifugal water pump 65 which is mounted in the bottom of the sump 60. This pump 65 takes a working fluid, for example water, from the sump 60 and distributes it to the various parts of the separating apparatus 10A that require a fluid service. It may also serve to periodically discharge a portion of the working fluid to drain. The centrifugal water pump 65 may be directly driven from a driveshaft equipped with a rotary seal to prevent fluid leakage. Alternatively, the centrifugal water pump 65 may be magnetically coupled. In both embodiments, one drive system, for example an electric motor, drives both the water pump 65 and the centrifugal separator 40. Thus, depression of the chamber pressure, particle scrubbing and working fluid circulation is conveniently achieved in a single separating apparatus 10A.

The chamber 30A, centrifugal separator 40 and the sump 60 are coaxially co-located within a common housing 200A.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

The invention claimed is:

1. A separator apparatus, comprising:
an inlet operable to receive an effluent stream comprising a fluid, water and particles;
a centrifugal separator comprising:
a cylindrical chamber defined by a base plate and an opposing plate coupled by a rim;
a rotatable radial fan comprising a plurality of vanes extending from said inlet towards said rim; and
a centrifugal particle separator operable to separate at least some of said particles and said water from said fluid, wherein the centrifugal particle separator comprises a plurality of conduits extending axially proximate said rim to receive said effluent stream, wherein a wall of said conduits is configured to entrain said particles and said water to separate said particles and said water from said fluid during rotation of said conduits as said effluent stream is conveyed therethrough;
a fluid outlet for providing said fluid; and
a particle outlet for providing said particles separated from said fluid.

2. The separator apparatus of claim 1, further comprising a water inlet operable to introduce water into said effluent stream.

3. The separator apparatus of claim 1, wherein said inlet is centrally-located in said opposing plate.

4. The separator apparatus of claim 1, wherein said particle outlet is located in said base plate and is operable to drain said particles and said water into a sump.

5. The separator apparatus of claim 1, wherein said fluid outlet is located in said opposing plate and is operable to vent said fluid.

6. The separator apparatus of claim 1, wherein said vanes taper towards said rim.

7. The separator apparatus of claim 1, wherein said vanes terminate prior to said rim to define a volute within which said effluent stream accelerated by said vanes is received.

8. The separator apparatus of claim 7, wherein walls of said volute are configured to entrain said particles and said water to separate said particles and said water from said fluid.

9. The separator apparatus of claim 1, wherein said particle outlet is provided proximate at least one of said rim and an end of said vane.

10. The separator apparatus of claim 1, wherein said fluid outlet is provided proximate at least one of said rim and an end of said vane.

11. The separator apparatus of claim 1, wherein each conduit comprises a conduit inlet for receiving said effluent stream and a conduit outlet as said outlet for venting said fluid, said particles and said water entrained by said wall draining back through said inlet.

12. The separator apparatus of claim 1, wherein said conduits are formed within an annular body extending along said rim.

13. The separator apparatus of claim 8, wherein fluid separated from said particles and said water entrained by said walls of said volute of said radial fan is conveyed to conduits of said centrifugal particle separator.

14. The separator apparatus of claim 1, wherein a tolerance between said inlet and said centrifugal separator is dimensioned to be packed by water to provide a rotational seal.

15. The separator apparatus of claim 2, further comprising a pump operable to pump water received from said particle outlet to at least one of said water inlet and a bearing supporting said centrifugal separator.

16. A method of treating an effluent steam, comprising:
receiving an effluent stream comprising a fluid and particles at an inlet;
centrifugally separating at least some of said particles from said fluid with a centrifugal separator comprising:
a cylindrical chamber defined by a base plate and an opposing plate coupled by a rim;
a rotatable radial fan comprising a plurality of vanes extending from said inlet towards said rim; and
a centrifugal particle separator operable to separate at least some of said particles from said fluid, wherein the centrifugal particle separator comprises a plurality of conduits extending axially proximate said rim to receive said effluent stream, wherein a wall of said conduits is configured to entrain said particles to separate said particles from said fluid during rotation of said conduits as said effluent stream is conveyed therethrough;
providing said fluid at a fluid outlet; and
providing said particles separated from said treated fluid at a particle outlet.

* * * * *